(12) United States Patent
Cuellar et al.

(10) Patent No.: US 8,312,550 B2
(45) Date of Patent: Nov. 13, 2012

(54) METHOD, SYSTEM AND APPARATUS FOR PROCESSING RIGHTS

(75) Inventors: Jorge Cuellar, Baierbrunn (DE); Hans-Georg Köpken, Erlangen (DE); Matthias Lenord, Bubenreuth (DE); Monika Maidl, München (DE)

(73) Assignee: Siemens AG, Munich (DE)

( * ) Notice: Subject to any disclaimer, the term of this patent is extended or adjusted under 35 U.S.C. 154(b) by 418 days.

(21) Appl. No.: 12/615,694

(22) Filed: Nov. 10, 2009

(65) Prior Publication Data

US 2010/0146598 A1  Jun. 10, 2010

(30) Foreign Application Priority Data

Nov. 10, 2008  (EP) .................................... 08019637

(51) Int. Cl.
*H04L 29/06* (2006.01)
(52) U.S. Cl. ....................................................... 726/25
(58) Field of Classification Search ................ 726/4, 17, 726/27, 30, 25
See application file for complete search history.

(56) References Cited

U.S. PATENT DOCUMENTS

| 7,707,114 | B2* | 4/2010 | Tuoriniemi ..................... 705/57 |
| 2001/0013064 | A1 | 8/2001 | Cox et al. |
| 2005/0209972 | A1* | 9/2005 | Bjorkengren et al. .......... 705/57 |
| 2006/0123025 | A1* | 6/2006 | DeMello et al. .............. 707/100 |
| 2006/0294018 | A1* | 12/2006 | Tuoriniemi ..................... 705/59 |
| 2007/0179898 | A1* | 8/2007 | Medvinsky et al. ............ 705/59 |
| 2007/0204078 | A1 | 8/2007 | Boccon-Gibod et al. |
| 2007/0226811 | A1* | 9/2007 | Kamperman et al. .......... 726/30 |

FOREIGN PATENT DOCUMENTS

| EP | 1 486 849 | 12/2004 |
| EP | 1 710 639 | 10/2006 |

* cited by examiner

*Primary Examiner* — Michael S McNally
(74) *Attorney, Agent, or Firm* — Cozen O'Connor

(57) ABSTRACT

A method for processing rights granted to an operator of a device or a group of devices using a rights object, wherein the method comprises at least the steps of receiving a rights object from the computer of a third party, generating at least one derived rights object based on the rights object received from the computer of the third party, and forwarding the at least one derived rights object to the device or individual devices from the group of devices. A system is provided which operates in accordance with the method. An apparatus that performs the method is also provided.

7 Claims, 5 Drawing Sheets

METHOD, SYSTEM AND APPARATUS FOR PROCESSING RIGHTS

BACKGROUND OF THE INVENTION

1. Field of the Invention

The present invention relates to the field of digital rights management and, more particularly, to a method for processing rights granted to an operator of a device or a group of devices using a rights object that can be forwarded electronically.

2. Description of the Related Art

Relevant devices in which digital rights management may be implemented include devices include production apparatuses. The digital rights, such as rights relating to the type and volume of goods that are to be produced or can be produced, may be conferred on an operator of such apparatuses by a digital rights object. However, companies often seek or are required to outsource work that arises upstream of production, accompanies production, arises afterward or only after the conclusion of production. Consequently, it is also desirable to provide digital rights management in devices that enable, e.g., a simulation of products to be created subsequently, or devices enabling other tests or investigations upstream of production to be performed.

In general, rights objects such as the above-described objects are used when a party needs to pass intellectual property, such as details about an article to be produced, out of house for either further production associated with the intellectual property, work or investigations upstream of production, as outlined above. Such a process of passing on information is always associated with risks for the rights of the owner of the intellectual property, which risks can be managed only to a limited extent by contractual safeguards.

On the one hand, the rights object is provided for precisely specifying the rights that the recipient of such data acquires in connection with the services respectively commissioned because an operator of corresponding production devices who acts as a production service provider must necessarily know structural or other technical details of the articles that are to be produced. On the other hand, the production of such articles is intended to be possible only within a contractually determined scope, such that the rights object codes at least one contractually agreed quantitative delimitation.

A service provider who, in a manner accompanying production or in the front end of production, performs, e.g., simulations of goods to be produced most probably is not required to know all the details of the respective article, such that a rights object communicated to this service provider, in the case of data which describe the respective article to its full extent, codes a read authorization only for those data which are relevant to the simulations that are to be performed by this service provider, such as only data regarding the geometry and regarding the surface constitution for flow analyses, and not data which relate to the internal functionality of the article. Conversely, for a service provider who needs to verify the electrical suitability of an apparatus or the functionality of the software that the apparatus comprises, a read authorization for data in this regard is coded by the respective rights object, while access to other data is denied.

Rights management (i.e., digital rights management (DRM)) as outlined above has been the subject of development efforts for some time and digital rights management is known, e.g., from the entertainment industry, where data carriers having video and/or audio data are provided with a copy protection to ensure that a purchaser does not make copies for unauthorized distribution. For service providers who are commissioned to produce data carriers by owners of intellectual property relating to such video and audio data, for example, it is known that the rights for creating a specific number of data carriers are granted to a specific production facility by a specific rights object in each case.

By contrast, the disclosed invention is directed to a problem associated with the creation, visualization, simulation, production, and the like of more complex products, such as parts for the automotive industry. In this case, a rigid rights allocation is not very practical and, therefore, prior electronic checking and delimiting of contractually granted rights have not occurred. Instead, the owner of the rights associated with the intellectual property has relied or had to rely on the economic interest of the recipient of such sensitive data over a long-term cooperative arrangement or agreement.

The unsuitability of conventional concepts for the field of automation technology, i.e., the automation of technical processes for simulation, visualization, design, production of, in particular industrially produced goods, is caused primarily by the fact that upon conclusion of a contract it is virtually unforeseeable which specific devices are used by the respective contractor for the services commissioned. In the case of a firm of consulting engineers concerned with flow analyses and in this respect, e.g., with the analysis of surface configurations of flow-sensitive articles, present-day computers, such as conventional personal computers, and if appropriate such a computer having an increased level of computing power, can comprise a device that can be used to perform a service which is accounted for by the present invention. If the service provider has a plurality of such devices available, each of these devices is taken into consideration. It is expedient for the service provider, however, if the service provider can decide, depending on workload and capacity utilization, which device or devices that the service provider may specifically wish to use to fulfill the respective order.

SUMMARY OF THE INVENTION

It is therefore an object of the present invention to make digital rights management practical and usable within the field of automation technology. This and other objects and advantages are achieved by a method for processing rights granted to an operator of a device or a group of devices using a rights object, where the method comprises at least the steps of receiving a rights object from a third party, generating at least one derived rights object based on the received rights object, and subsequently forwarding the at least one derived rights object to the device or individual devices from the group of devices.

Within the scope of the disclosed invention, the term device relates to, as already used in the background of the invention, apparatuses and the like which are used by the operator to provide services with respect to the third party, i.e., the rights owner.

Also provided is a system in which the method is implemented, where the system provides processing of rights granted to an operator of a device or a group of devices using a rights object, and wherein the system is communicatively connected or connectable to the device or a group of devices by means for receiving a rights object from a third party, means for generating at least one derived rights object based on the received rights object and means for forwarding the at least one derived rights object to the device or individual devices from the group of devices.

Other objects and advantages of the invention are also achieved by an apparatus associated with the aforementioned system, e.g., an apparatus for processing rights granted to an operator of a device or a group of devices using a rights object, wherein the apparatus is communicatively connected or connectable to the device or individual devices from the group of devices, and wherein the apparatus comprises a functionality for receiving a rights object from a third party, a functionality for generating at least one derived rights object based on the received rights object and a functionality for forwarding the at least one derived rights object to the device or individual devices from the group of devices.

For the step of generating the at least one derived rights object, a network rights agent is preferably provided, which uses generation rules encompassed by the received rights object for generating derived rights objects. The network rights agent is the central functional object of the method, and the network rights agent is that entity which centrally performs the generation of derived rights objects. If derived rights objects are generated by the network rights agent based on generation rules encompassed by the received rights object, the rights owner, i.e., the sender of the original rights object, can influence, e.g., restrict the generation of derived rights objects, such that not more than a specific number of derived rights objects are generated. Instead, only derived rights objects for devices of a specific type and/or performance scope are generated. For the recipient of the original rights object, the generation of derived rights objects by the network rights agent provides the advantage that those devices to which the at least one derived rights object is forwarded can be utilized for fulfilling the order associated with the received rights object.

Preferably, the step of forwarding derived rights objects is performed by the same network rights agent. To that end, the network rights agent is communicatively connected to the device or each individual device of a group of devices. The generation and forwarding of derived rights objects is thus "in one hand" and the use of one and the same functionality for both method steps has the advantage, for example, that necessary data for generating and forwarding derived rights objects with regard to the devices available to the operator as contractor only have to be supplied once, and at least have to be processed by only one functionality, i.e., the network rights agent.

Furthermore, the network rights agent preferably uses forwarding rules that are encompassed by the received rights object or are made available separately for forwarding derived rights objects. While the abovementioned generation rules essentially relate to conditions predefined by the rights owner, the forwarding rules are at least in part also based on conditions oriented to the type and number of the devices available to the operator as contractor of a specific service. Depending on the extent to which the rights owner, i.e., the issuer of the rights object, seeks to influence the forwarding of derived objects (i.e., the rights allocation to individual devices of the contractor) the forwarding rules are either contained in the originally received rights object or made available separately. Mixed forms are conceivable, such that individual forwarding rules or conditions to be taken into account, in the case of complex forwarding rules, are encompassed by the originally received rights object and that other conditions are predefined separately, e.g., such as by the operator/contractor.

In a preferred embodiment of the method, forwarding derived rights objects based on the forwarding rules made available separately comprises first ascertaining which device or devices from the group of devices is or are suitable for performing operations permitted with the received rights object or a derived rights object, and second forming a set, comprising the device or each suitable device, determining an instantaneous or future capacity utilization of each device that the previously determined set comprises, reducing the formed set by eliminating each device, for which a capacity utilization above a predefined or predefinable threshold value has been determined and finally forwarding the at least one derived rights object to the device or each device that is still a member of the formed set. The contemplated embodiment of the method provides the ability to implement a flexibility that is desirable for the operator, i.e., the contractor for the rights owner. Here, the initial step involves ascertaining which of the devices that the operator has available can actually be used for the service commissioned. If a plurality of devices are taken into consideration, in principle, the forwarding can be controlled such that forwarding of the rights object occurs specifically to those devices or precisely that device which, in accordance with the capacity utilization thereof, is best suited to the use in connection with the order placed by the rights owner. The capacity utilization and the threshold value with regard to the capacity utilization can relate to a temporal or quantitative capacity utilization or combinations thereof.

As an alternative or in addition, the step of receiving a rights object from a third party advantageously comprises checking a signature which the received rights object comprises and which was attached by the third party for the authentication of the rights object. As a result, the contractor, i.e., the operator of the device or devices, is ensured that the received rights object actually originates from the rights owner or at least from a source authorized by the latter. The reliability of the data that the rights object comprises is thus ensured.

The received rights object is always transmitted in an encrypted manner. As a result, unauthorized third parties who intercept the process of transmitting the rights object cannot read and use the data that the rights object comprises. Here, the step of receiving a rights object from a third party comprises at least decrypting the received rights object using a key or key pair, the public part of which was communicated or is communicated to the third party for the encryption of the rights object. The key pair is thus generated on the service provider side and a part of the key, preferably the public part, is communicated to the third party as rights owner. The third party uses the key thus obtained to encrypt a rights object to be sent. In this manner, the service provider can decrypt the rights object and access the data comprising that the rights object.

As data, the rights object comprises at least one further key, which is required to be able to access data which have already been communicated or are to be communicated and which represent the intellectual property of the third party. Here, it is particularly preferably provided that the key for decrypting the received rights object, i.e., the part of the originally generated key pair that remains with the service provider, is stored in a memory accessible only to the network rights agent. The decryption thus becomes transparent to the service provider and can be handled automatically by the network rights agent.

On the other hand, the storage of the key in a memory accessible exclusively to the network rights agent ensures additional security against unauthorized use of the data that have been communicated or are to be communicated, since only this key permits access to the rights object and, with access to the rights object and the key contained therein, access to the respective intellectual property. Here, in the case of an authorized access by the network rights agent to a rights object, a key which is contained therein and which is required for accessing separately communicated intellectual property is likewise preferably kept in a memory accessible only to the network rights agent, preferably in the memory exclusively accessible to the above-mentioned network rights agent.

A decryption performed on the contractor/operator side renders the data that the received rights object comprises, specifically the key for accessing the data secured with the rights object, readable and processable again. Consequently, after the decryption, it is possible for derived rights objects to be generated and forwarded to a device or individual devices from the group of devices. For the encryption and decryption of the data to be transmitted, an approach is employed that is also used in known methods for digital rights management: firstly, a key pair, preferably a key pair of an asymmetric key, is generated on the service provider side. A part of the key pair is acquired by the rights owner, who can with its part of the key pair, i.e., the public key, encrypt a rights object to be communicated to the service provider. The rights object, for its part, contains a key that is to be used for decrypting the intellectual property respectively communicated.

The described system, with which the above-described objective is achieved, similarly to the method and the configurations thereof that have been described, is distinguished in advantageous embodiments by means provided for performing the individual method steps which the method and the configurations thereof comprise. Here, reference is made to the above description with the understanding that associated with each method step is a functionality of the overall system which precisely performs each method step.

Moreover, as the described apparatus is concerned with which the objectives of the above-described invention are achieved, reference can essentially be made to the above description of the method and the configurations thereof. The apparatus is functionally substantially identical to the network rights agent and the designations are also used synonymously in this respect hereinafter. The apparatus recited in the claims is actually a device with which the functionality of the network rights agent is implemented. The functionality of the network rights agent is subdivided, in turn, into individual functionalities, e.g., receiving a rights object from a third party, generating derived rights objects and forwarding the rights objects to individual devices from the group of devices. Regarding preferred embodiments of the apparatus, i.e., the network rights agent, reference is also made to the above description with the understanding that there is associated with each method step on the part of the network rights agent, a functionality for performing it.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained in greater detail below with reference to the drawing. Mutually corresponding subject matters or elements are provided with the same reference symbols in all the figures, in which.

DETAILED DESCRIPTION OF THE EXEMPLARY EMBODIMENTS

Figure 1:
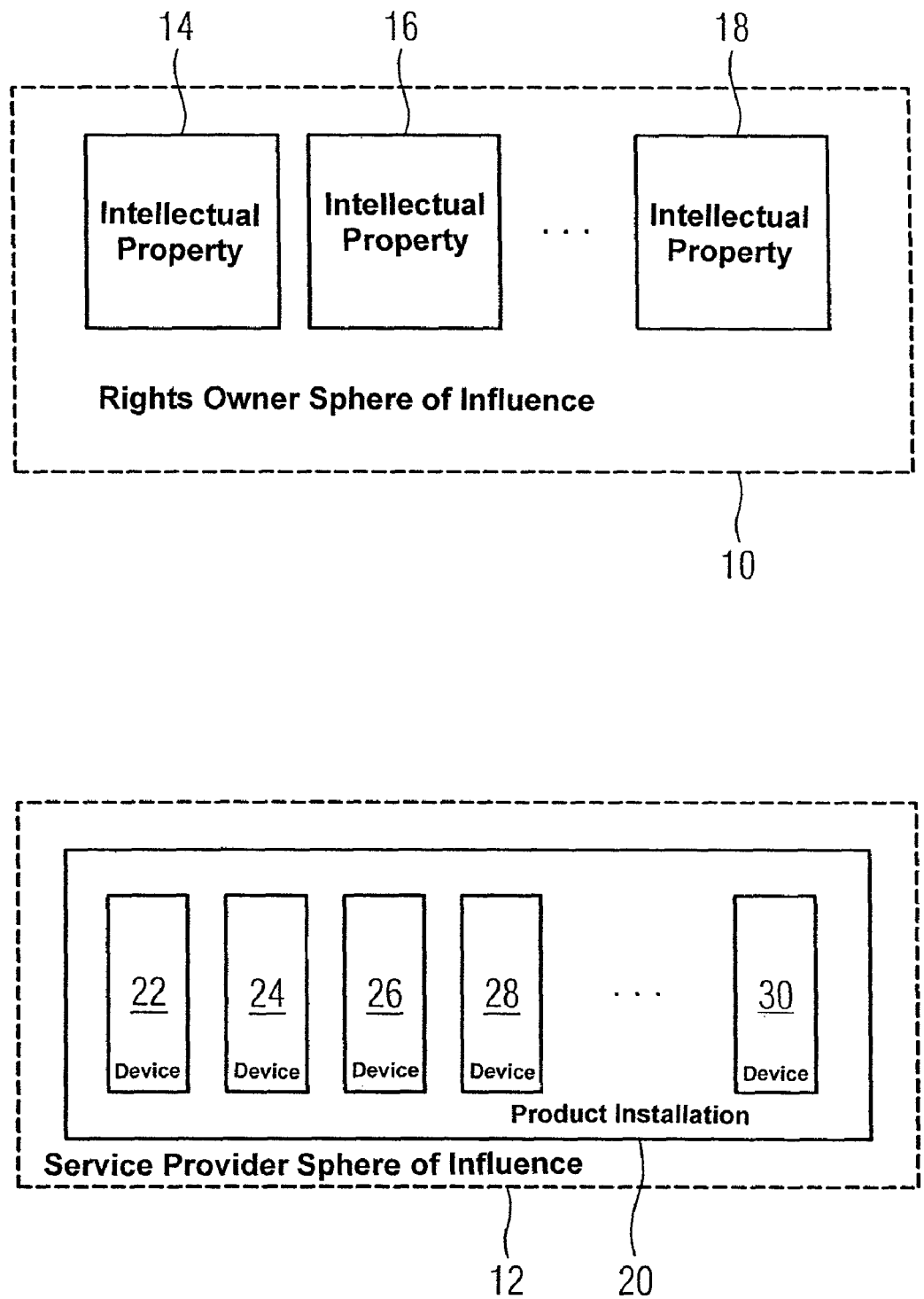
FIG. 1 is a schematic illustration of a sphere of influence of a rights owner with intellectual property of the rights owner and a sphere of influence of a service provider with devices which are taken into consideration, e.g. for the production of goods in accordance with the intellectual property in which the intellectual property has to pass over to the sphere of influence of the service provider.

FIG. 1 shows, in a schematically simplified manner, a scenario to which the invention is directed. Here, a sphere of influence 10 of a rights owner is illustrated schematically in the upper part of the illustration and a sphere of influence 12 of a service provider is illustrated in the lower region. In its sphere of influence 10, the rights owner has intellectual property 14, 16, 18, such as construction plans with dimensions, for the production of a product, such as an automobile part. In the contemplated scenario, it should be recognized that the rights owner is unable or unwilling to perform the production of the product. For this purpose, therefore, part of the intellectual property 14, 16, 18 of the rights owner is communicated to a service provider. In its sphere of influence 12, the service provider has, for example, a production installation 20 with production means, designated hereinafter as devices 22, 24, 26, 28, 30 (collectively referred to as 22-30). In addition, a manufacturing service provider, such as a firm of consulting engineers which does not perform production of the product but rather performs analyses, e.g., flow analyses, in preparation for production or to accompany production, is equally considered to be a service provider. These and other conceivable services and devices 22-30 provided for accomplishing them should be deemed to be encompassed by the description below when reference is made to the "production", the installation 20 and at least on devices 22-30 that the latter comprises.

For instigating production of a part by third parties, rights owners were previously required to transfer elements of their intellectual property 14, 16, 18 influence 12 thereof. For this purpose, in principle any medium is taken into consideration and although historically the transfer of construction plans, for example, should initially be presumed, nowadays electronic data, i.e., CAD, CAM, CAE data, etc. are usually exchanged.

With the availability of the intellectual property 14, 16, 18 of the rights owner in the sphere of influence 12 of the operator of the installation 20, the operator can proceed at its own discretion with the other entity's intellectual property 14, 16, 18. The possibility for influence on the part of the rights owner is limited to contractual agreements with the operator of the installation 20 and the enforceability of the agreements relative to the operator, which is often inadequate for the rights owner.

Methods for protecting rights relating to intellectual property are known specifically from the entertainment industry, and copy protection mechanisms can be cited as a well-known example. Copy protection mechanisms are not successful in the present scenario, however, since copy protection could at best prevent a duplication of another entity's intellectual property in the sphere of influence 12 of the operator of the installation 20, but otherwise leaves the other entity's intellectual property 14, 16, 18 accessible without restrictions in the sphere of influence 12, such that an electronic embodiment of intellectual property 14, 16, 18 can be transferred, such as by print-out, to a different medium and can readily be duplicated from that.

Furthermore, it is also known for individual devices 22-30 of an installation 20 to be permitted only to perform the production of a specific quantity of goods by corresponding control unit or a supplementation of such a unit. This is known, e.g., from the field of cigarette production, where a manufacturer with its installations, i.e., devices 20-30, can perform work for different brand owners, of course, where each brand owner has an interest in the fact that only the quantity agreed with the operator of the installation 20 is produced under the owner's brand. For the generalized problem on which the invention is based, this approach is also unsuccessful, because exclusively quantitative limitations can be predefined for respective individual devices 22-30. The operator of the installation 20 cannot react flexibly to customer desires and, for example, produce quantities desired by the rights owner in a shorter time by using more than one device 22-30 for production without having to intervene in the control units of the respective devices 22-30. Moreover, the quantitative limitations are stored in a complicated manner and largely without the possibility of verification by the rights owner.

Figure 2:
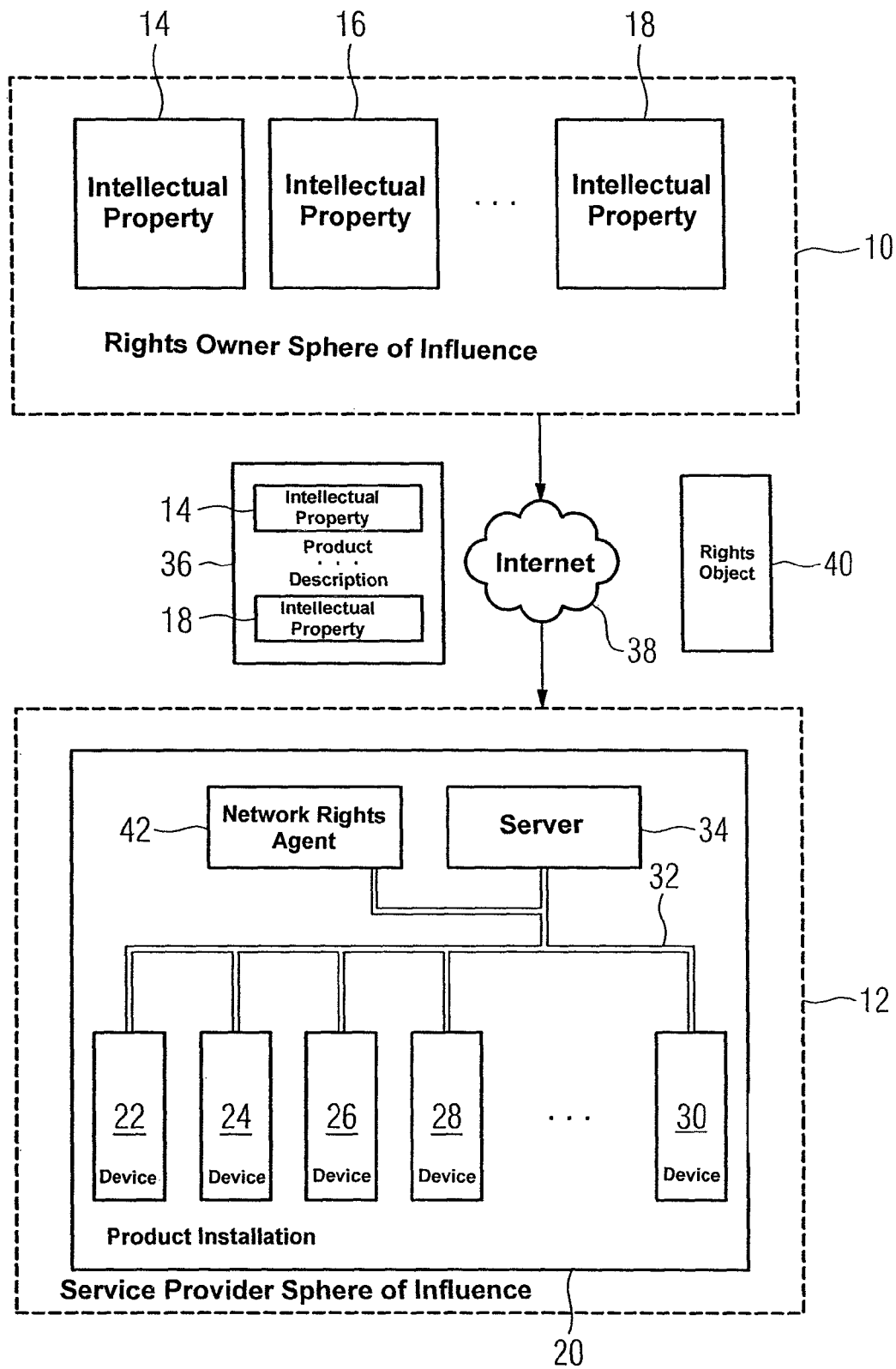
FIG. 2 is a schematic illustration of a system for securing the intellectual property against unauthorized use in conjunction with a high level of flexibility of the use of said intellectual property in or on individual or a plurality of devices in accordance with the invention.

With reference to FIG. 2, which repeats structure shown in FIG. 1, the sphere of influence 10 of the rights owner can also be interpreted as a representation of the rights owner itself and the sphere of influence 12 of the operator of the installation 20 can correspondingly also be interpreted as a schematic representation of the operator itself. Accordingly, the reference symbols introduced are also used hereinafter for the rights owner 10 and the operator/contractor 12.

The approach according to the invention firstly is based on the fact that on the operator side it is presupposed that, between the devices 22-30 that comprise the installation 20, there is a communicative connection for communication of data to the devices, but also for data exchange among one another, such as a bus 32, and in particular a field bus. Furthermore, it is presumed that the installation 20 comprises at least one superordinate unit 34 which in linguistic usage is often referred to as a server or the like, which, via the bus 32 predefines for the devices 22-30 desired values for production processes, such as material thicknesses or operating speeds. In a departure from the illustration in FIG. 2, the server can also comprise one of the devices 22-30 and can be implemented in a control part assigned to each device 22-30, but not illustrated separately.

If the rights owner 10 wants a product to be manufactured in a specific number of items, such as by the operator 12 (contractor) in accordance with the initially described embodiment, the rights owner 10 communicates part of its intellectual property 14, 16, 18 in this regard in the form of a product description 36. The product description 36 is communicated electronically, such as through the use of known data exchange means, i.e., the Internet 38 or any other known or hereafter developed network. For such a transmission, the product description 36 is encrypted using a key which is not known to the service provider and which is transmitted in the rights object 40 to the network rights agent 42. Together with the product description 36, if appropriate, also encompassed by the latter, a possibly likewise encrypted and/or electronically signed rights object 40 is transmitted to the contractor 12. The rights object 40 is encrypted using a part of a key pair generated on the service provider side and communicated to the rights owner. The key pair is preferably an asymmetric key and the part communicated to the rights owner is preferably the public part of such a key pair. The rights owner encrypts each rights object using its part of the key pair. In turn, the service provider keeps its part of the key pair and uses it to decrypt received rights objects. A key which the rights object comprises and which is necessary for decrypting the product description 36 thus becomes accessible.

The rights object 40 is linked to the product description 36 and defines the possibilities for use of the product description 36 that are permitted or granted to the contractor 12 in the context of the contract that has been concluded or is to be concluded between rights owner 10 and contractor 12. However, the mere availability of the rights object 40 on the part of the contractor 12 does not yet create the flexibility that is to be desired, especially by the contractor 12, and in the final analysis is beneficial to both parties. For such flexibility, on the part of the operator 12, a network rights agent 42, or an apparatus which is not otherwise illustrated in more specific detail, with which such a functionality is implemented, is provided as part of the installation 20 of the operator. The network rights agent 42 functions logically as an interface between the received rights object 40 and individual or all individual devices 22-30 of the installation 20 with which the operator 12 can perform services for the rights owner 10. For this purpose, the network rights agent 42 is communicatively connected to the server and at least one device 22-30, by the network rights agent being connected to the bus 32 in the case illustrated.

Figure 3:
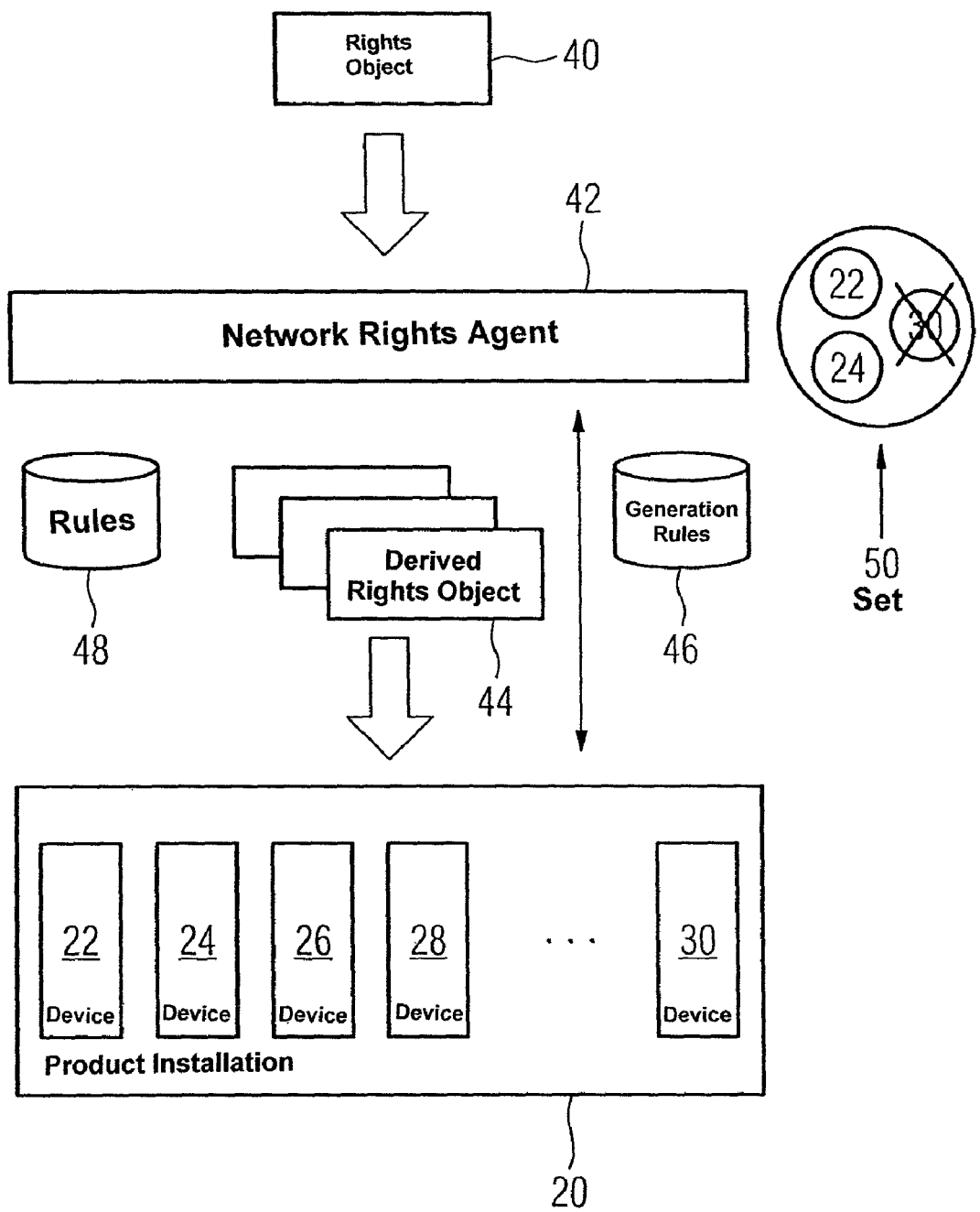
FIG. 3 is a schematic illustration of a preferred embodiment of the system of FIG. 2.

FIG. 3 is a schematic illustration of the functionality of the network rights agent 42 of FIG. 2 in accordance with the invention. The network rights agent 42 or an apparatus comprising the agent 42 is an example of the device mentioned in the introductory part of the description for achieving the above-described objectives. Accordingly, the configuration shown in FIG. 3 is an example of the system mentioned in the summary of the invention for achieving the above-described objective.

The network rights agent 42 is provided for receiving and processing the rights object 40. From the received rights object 40, at least one derived rights object 44 is generated and forwarded to one or individual devices 22-30. For generating derived rights objects 44, the network rights agent 42 has access to generation rules 46, which, in the illustration in FIG. 3 are illustrated as a database in which such rules can be stored and made available. For forwarding individual or a plurality of derived rights objects 44 to an individual device, a plurality of devices or to all of the devices 22-30, the network rights agent 42 has access to forwarding rules 48, which are likewise illustrated in the form of a database in which such rules can be collected.

The generation rules 46 are received at least in part with the respective rights object 40, such that the rules are originally encompassed by the rights object 40 and are accessed either directly from the received rights object 40 or from the database illustrated. The forwarding rules 48 can also be encompassed at least in part by the originally received rights object 40. In addition, provision is also made for forwarding rules 48 to be made available separately. Forwarding rules 48, possibly encompassed by the rights object 40, are either accessed directly at the latter or all forwarding rules 48 are accessed in a database provided therefor.

The generation of derived rights objects 44 based on the received rights object 40 and the generation rules 46 encompassed thereby can relate, for example, depending on the product description 36, especially if the product to be produced necessitates previous production of individual parts, to the generation of a derived rights object 44 for a respective device 22-30. With each device 22-30, exactly one of the individual parts can be manufactured under the boundary conditions defined by the originally received rights object 40. A further device 22-30 is authorized to assemble the individual parts in accordance with the same conditions. In another embodiment, a plurality of devices 22-30 are configured to produce the product or individual parts thereof, such that, in the case of three or more devices 22-30 that are suitable in this regard, these devices are enabled for production of a third, a quarter, etc. of the total quantity permitted by the originally received rights object 40 through the generation of corresponding derived rights objects 44.

In one particularly preferred embodiment, which is illustrated by the double-headed arrow between installation 20 and network rights agent 42, the forwarding of derived rights objects 44, based on forwarding rules 48 made available separately, comprises a data exchange between installation 20 and network rights agent 42, wherein, during this data exchange, the network rights agent 42 ascertains which device or devices 22-30 is or are suitable for performing operations permitted by the received rights object 40 or a derived rights object 44. For this purpose, the received rights object or a rights object 44 derived therefrom comprises a coding of the operation to be performed, and the coding of operations which the latter can perform can be retrieved from at least one device 22-30. In this way, it is possible to determine which of the devices 22-30 are taken into consideration for individual operations. This information can be used to form a set 50 comprising the or each suitable device 22-30. In a subsequent step, the network rights agent 42 or a functionality called up for this purpose by the network rights agent 42 determines an instantaneous or future capacity utilization of each device 22-30 that the previously determined set 50 comprises. For this purpose, the network rights agent 42 or a functionality called up by the agent 42 accesses information that codes instantaneous or future capacity utilizations of each device 22-30, either at the respective device 22-30 itself or at a central location in the installation 20, such as at the server. In view of this information, the set 50 is reduced by the elimination of each device 22-30 for which a capacity utilization above a predefined or predefinable threshold value was determined. In this case, the threshold value can result from the data encompassed by the originally received rights object 40, such that a derived rights object 44 is not forwarded to a device 22-30 whose capacity is utilized during a specific time period, if the operations permitted by the rights object 40 are allowed only for a time span that proceeds during the specific time period. Otherwise, during the forwarding of derived rights objects 44, criteria from the linear or dynamic optimization can be taken as a basis, e.g., such that the commissioned service is accomplished by devices 22-30 which enable time- and/or cost-optimal processing. Data which relate to a capacity utilization situation of individual or a plurality of devices 22-30 and conditions derived therefrom or conditions which result from linear or dynamic optimization approaches are examples of forwarding rules 48 that are made available, i.e., independently of the originally received rights object 40.

In order to elucidate the above, a textual form of a possible content of a rights object 40 (see FIG. 3) is presented below by way of example:

IF (current-date in time-frame) ALLOW produce (part, number-of parts, quality range, maximum-machine number); number-of-parts:=100;
max-machine-number:=10;
time-frame:=01.10.2008, 23.12.2008

Rights Object

Based on the essentially self-explanatory syntax for the specification of the rights which are defined by a rights object 40 and are granted to a contractor/operator 12 (see FIG. 2), it is apparent from the above-example that a maximum of one hundred parts are allowed to be produced in accordance with the product description 36 received together with the rights object. In addition, the production is allowed to take place on a maximum of ten devices 22-30 and the rights are granted during the time span specified in terms of dates, such that no production is permitted before and after the specified time span.

For generating and forwarding derived rights objects 44 based on generation rules 46 and forwarding rules 48, additional information can be taken into consideration, this information being inserted below as configuration and boundary condition data by way of example:

M1: Type T, M2: Type T' [, . . . ]
Machine M1 can produce x parts in time y with quality z when using configuration conf;
Machine M2 can produce x' parts in time y' with quality z' when using configuration conf'

Configuration Data

Machine M1 available from time t1 to time t2;
Machine M2 available from time t1' to time t2'

Boundary Condition Data

An example of the content of a derived rights object 44, wherein the network rights agent 42, for the generation thereof, can use known optimization methods, such as those proposed, e.g., for solving a job shop scheduling problem (linear optimization, dynamic optimization, branch-and-bound, genetic algorithms, etc.), is finally inserted by way of example:
ALLOW produce (part, 20, conf);

Derived Rights Object

The use of the abovementioned or otherwise appropriate optimization methods relates to the fact that information about the configuration of the installation 20, i.e., about the type of devices 22-30 that the installation comprises, is available to the network rights agent 42, either in the forwarding rules 48 or in some other suitable manner. On the basis of only such static data, the network rights agent 42 can perform an initial optimization by generating derived rights objects 44, such that the commissioned service can be performed optimally by the installation 20, such as by the generation of a plurality of derived rights objects 44, if the installation comprises a plurality of identical devices 22-30 and partial tasks can thus be processed in parallel. As soon as dynamic data are added, e.g., data which code the capacity utilization of individual devices 22-30, the optimization can be refined such that division of identical partial tasks among a plurality of devices is performed, e.g., only when the results of the partial tasks can be processed or processed further at a corresponding speed. It is not easy to estimate the variation possibilities. For the description of the presently contemplated embodiments, an indication that the network rights agent 42 or a functionality used by the latter comprises an implementation of suitable optimization methods is sufficient.

The disclosed embodiments of the invention thus provide a method for processing rights granted to an operator of a device 22, 24, 26, 28, 30 or a group of devices 22-30 by use of a rights object 40 comprising at least the steps of receiving a rights object 40 from a third party, generating at least one derived rights object 44 based on the received rights object 40, and forwarding the at least one derived rights object 44 to the device 22-30 or individual devices from the group of devices 22-30, along with a system which operates in accordance with the method, and an apparatus provided for performing the method.

Figure 4:
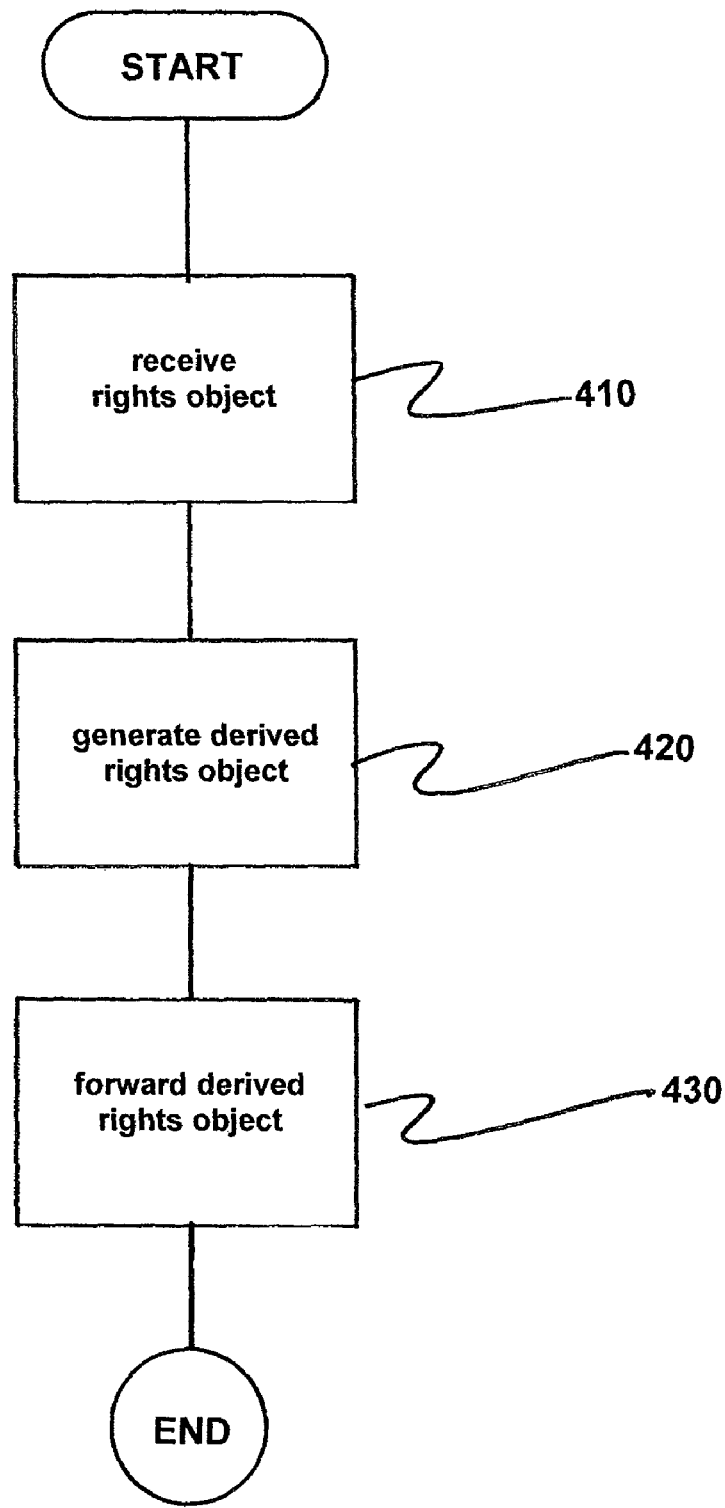
FIG. 4 is a flow chart of the method in accordance with the invention.

FIG. 4 is a flow chart illustrating the method of the invention. With specific reference to FIG. 4, the method for processing rights granted to an operator of a device or a group of devices using a rights object comprises receiving the rights object from a computer of a third party, as indicated in step 410. Next, at least one derived rights object is generated based on the rights object received from the computer of the third party, as indicated in step 420. The at least one derived rights object to the device or individual devices is then forwarded from the group of devices, as indicated in step 430.

The exemplary embodiments of the invention are described above with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Figure 5:
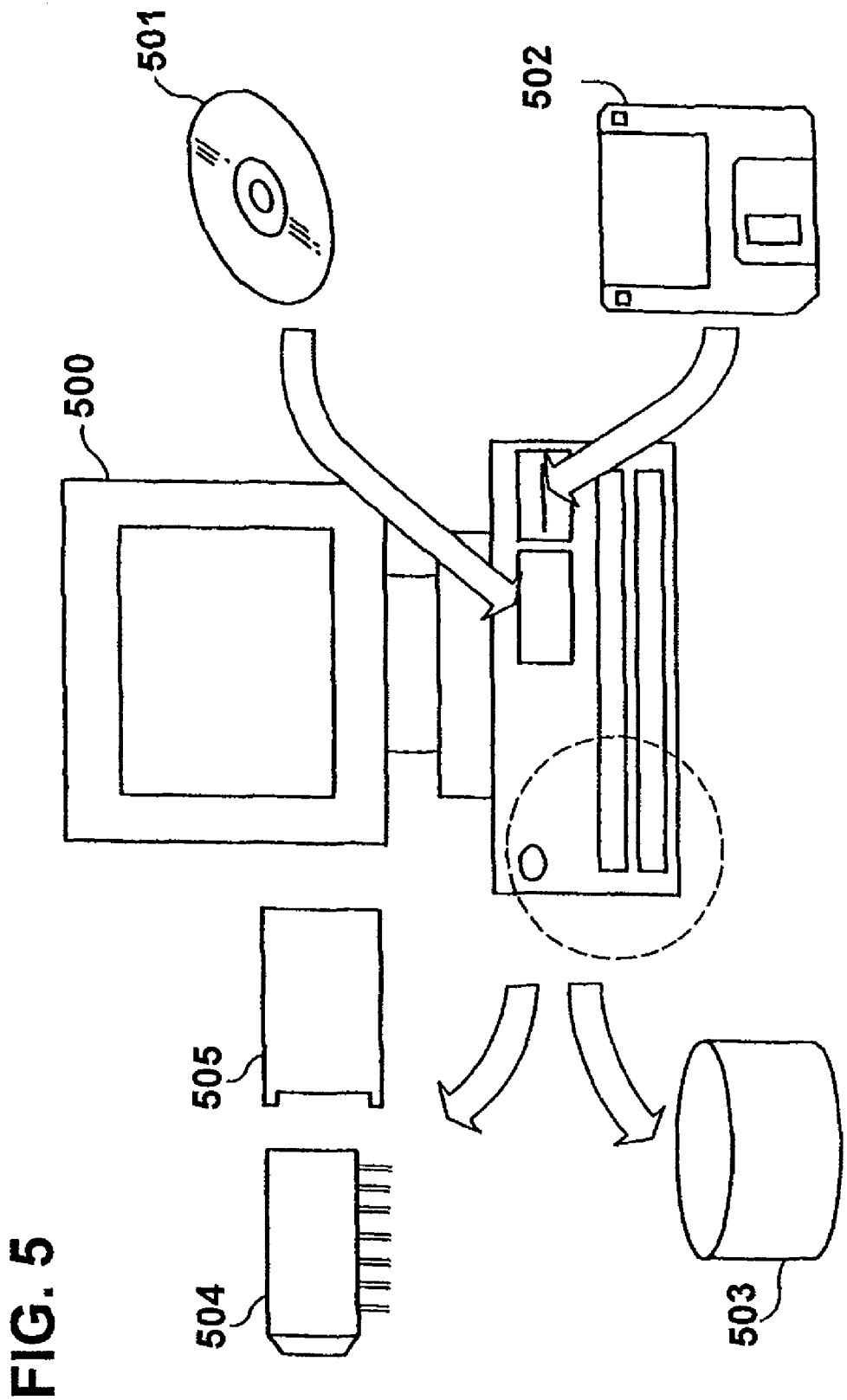
FIG. 5 is an illustration of exemplary recording media.

In the specification, the term "media" means any medium that can record data therein. FIG. 5 shows exemplary recording media. Here, the term "media" includes, for instance, a disk shaped media 501 such as CD-ROM (compact disc-read only memory), magneto optical disc or MO, digital video disc-read only memory (DVD-ROM), digital video disc-random access memory (DVD-RAM), a floppy disc 502, a memory chip 504 such as random access memory (RAM), read only memory (ROM), erasable programmable read only memory (E-PROM), electrical erasable programmable read only memory (EE-PROM), a rewriteable card-type read only memory 505 such as a smart card, a magnetic tape, a hard disc 503, and any other suitable means for storing a program therein.

A recording media storing a program for accomplishing the above mentioned apparatus maybe accomplished by programming functions of the above mentioned apparatuses with a programming language readable by a computer 500 or other processor, and recording the program on a media such as mentioned above.

Moreover, a server equipped with a hard disk drive may be employed as a recording media. It is also possible to accomplish the disclosed embodiments of the invention by storing the above mentioned computer program on such a hard disk in a server and reading the computer program by other computers through a network.

As the computer processing device 500, any suitable device for performing computations in accordance with a computer program may be used. Examples of such devices include a personal computer, a laptop computer, a microprocessor, a programmable logic device, or an application specific integrated circuit.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

Each exemplary embodiment should not be understood as a restriction of the invention. Rather, in the context of the present disclosure, numerous alterations and modifications are possible, in particular those variants and combinations which, for example, through combination or modification of individual features or elements or method steps which are described in conjunction with those which are described in the general or specific part of the description and are also contained in the claims and/or the drawing, are discernable to the person skilled in the art with regard to achieving the object and, through combinable features, lead to a new subject matter or to new method steps or method step sequences, even insofar as they concern operating methods.

What is claimed is:

1. A method for processing rights granted to an operator of a device or a group of devices using a rights object, comprising the steps of:
   receiving, at a computer, the rights object from a computer of a third party;
   generating, at the computer, at least one derived rights object based on the rights object received from the computer of the third party; and
   forwarding the at least one derived rights object to the device or individual devices from the group of devices, said forwarding comprising the steps of:
   ascertaining which device or individual devices from the group of devices is suitable for performing operations permitted with the received rights object or a derived rights object, and forming a set comprising at least one suitable device;
   determining an instantaneous or future capacity utilization of each device that the formed set comprises and reducing the formed set by eliminating each device for which a capacity utilization above a predefined or predefinable threshold value has been determined; and
   forwarding the at least one derived rights object to the device or group of devices that remain within the formed set.

2. The method as claimed in claim 1, wherein the step of generating the at least one derived rights object is performed using a network rights agent which implements generation rules encompassed by the received rights object.

3. The method as claimed in claim 1, wherein the step of forwarding the at least one derived rights object is performed using a network rights agent which is communicatively connected to the device or group of devices.

4. The method as claimed in claim 3, wherein the network rights agent uses forwarding rules which are encompassed by the received rights object or are made available separately to forward the at least one derived rights object to the device or individual devices from the group of devices.

5. The method as claimed in claim 1, wherein the step of receiving the at least one rights object from the computer of the third party comprises the step of
checking a signature which the received at least one rights object comprises and which was attached by the third party for authentication of the received at least one rights object.

6. The method as claimed in claim 2, wherein the step of receiving the at least one rights object from the computer of the third party comprises the step of:
decrypting the received at least one rights object using a key or key pair, the public part of which was communicated or is communicated to the third party for encryption of the received at least one rights object.

7. The method as claimed in claim 6, wherein the key or key pair is stored in a memory accessible only to the network rights agent.

* * * * *